(12) United States Patent
Gallagher et al.

(10) Patent No.: US 7,522,773 B2
(45) Date of Patent: Apr. 21, 2009

(54) USING TIME IN RECOGNIZING PERSONS IN IMAGES

(75) Inventors: Andrew C. Gallagher, Brockport, NY (US); Madirakshi Das, Rochester, NY (US); Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 504 days.

(21) Appl. No.: 11/116,729

(22) Filed: Apr. 28, 2005

(65) Prior Publication Data

US 2006/0245624 A1 Nov. 2, 2006

(51) Int. Cl.
G06K 9/62 (2006.01)

(52) U.S. Cl. .................. 382/224; 382/118; 382/159; 358/903; 700/94

(58) Field of Classification Search .................. 382/224
See application file for complete search history.

(56) References Cited

U.S. PATENT DOCUMENTS

| | | | | |
|---|---|---|---|---|
| 4,276,570 | A * | 6/1981 | Burson et al. | 382/276 |
| 5,781,650 | A * | 7/1998 | Lobo et al. | 382/118 |
| 6,922,201 | B2 * | 7/2005 | Blish et al. | 345/646 |
| 2002/0067856 | A1 | 6/2002 | Fujii et al. | |
| 2004/0247177 | A1 * | 12/2004 | Rowe et al. | 382/159 |
| 2006/0140455 | A1 * | 6/2006 | Costache et al. | 382/118 |
| 2007/0043459 | A1 * | 2/2007 | Abbott et al. | 700/94 |
| 2007/0230799 | A1 * | 10/2007 | Shniberg et al. | 382/224 |

FOREIGN PATENT DOCUMENTS

GB 2 402 535 12/2004

OTHER PUBLICATIONS

Jones et al, Fast Multi-view Face Detection, IEEE Conf. on Computer Vision and Pattern Recognition (CVPR), Jun. 2003.
Yuille et al, Feature Extraction from Faces Using Deformable Templates, Int. Journal of Comp. Vis., vol. 8, Iss. 2, 1992, pp. 99-111.
Cootes et al, Constrained Active Appearance Models, 8th International Conf. on Computer Vision, vol. 1, pp. 748-754, IEEE Computer Society Press, Jul. 2001.
Bolin et al, An Automatic Facial Feature Finding System For Portrait Images, Proceedings of IS&T PICS Conference 2002.
Turk et al, Eigenfaces for Recognition, Journal of Cognitive Neuroscience, vol. 3, No. 1, 71-86, 1991.
Farkas et al, Anthropometry of the Head and Face, 2nd Ed., Raven Press, New York 1994, p. 22 and 89-102.

* cited by examiner

*Primary Examiner*—Samir Ahmed
*Assistant Examiner*—Aklilu k Woldemariam
(74) *Attorney, Agent, or Firm*—Raymond L. Owens

(57) ABSTRACT

A method of identifying at least one particular person of interest in a collection of digital images taken over time, includes providing the collection of digital images with each digital image containing one or more persons; storing in a digital database an appearance model having a set of features that are distance measurements associated with facial features of the particular person of interest at an associated time; and providing an individual recognition classifier that uses the appearance model and the associated time to identify the particular person of interest in images from the collection of digital images.

11 Claims, 10 Drawing Sheets

USING TIME IN RECOGNIZING PERSONS IN IMAGES

CROSS REFERENCE TO RELATED APPLICATIONS

Reference is made to commonly assigned, U.S. patent application Ser. No. 10/932,553, filed Sep. 1, 2004, by Andrew C. Gallagher, entitled "Determining the Age of a Human Subject in a Digital Image", the disclosure of which is incorporated herein by reference.

FIELD OF THE INVENTION

The invention relates to image processing and more particularly relates to the identification or recognition of a person of interest in a collection of digital images or videos.

BACKGROUND OF THE INVENTION

With the advent of digital photography, consumers are amassing large collections of digital images and videos. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases.

One of the most fundamental subjects of consumer photography is people. Furthermore, in a given collection of digital images and videos, certain people tend to occur frequently. For example, it is common for most images captured by new parents to contain their new baby. Consumers desire the ability to find all images from their collection containing a specific person. However, this is technically a very difficult task. For example, the baby will grow from baby to toddler to child to adult and radically change in appearance.

There exists many image processing packages that attempt to recognize people for security or other purposes. Some examples are the FaceVACS face recognition software from Cognitec Systems GmbH and the Facial Recognition SDKs from Imagis Technologies Inc. and Identix Inc. These packages are primarily intended for security-type applications where the person faces the camera under uniform illumination, frontal pose and neutral expression. These methods are not suited for use in personal consumer images due to the large variations in pose, illumination, expression and face size encountered in images in this domain. Furthermore, these systems are targeted for use on adult faces and cannot successfully recognize an image of a particular person of interest at any age.

Several image processing techniques have been described for detecting the age of a person from a digital image. For example, Lobo and Kwon describe a method of classifying the age of human faces in digital images in U.S. Pat. No. 5,781,650. They perform facial measurements and a wrinkle analysis using snakes and classify the age of the person into the categories of: baby (up to about 3 years), junior (3 to 40 years), and senior (over 40 years). This method does not discuss the problem of recognizing the identity of people in the image. Other image processing techniques are known which us facial recognition. For example, U.S. Published Patent Application US 2004/0247177A1 uses eigenfaces to characterize the pixel density pattern of a subject's face. All of the above techniques suffer from problems and can misidentify persons of interest.

SUMMARY OF THE INVENTION

It is an object of the present invention to provide an improved way of identifying a person in a collection of images. It has been determined that it is particularly effective to use appearance models having features based on distance measurements between facial features of known persons of interest to classify unknown persons. In adults, these distance measurement features do not generally vary over time and the accuracy of a search for an person of interest is improved. In children, whose features change rapidly with growth, appearance models that use distance measurements can be effectively used.

The object is achieved by a method of identifying at least one particular person of interest in a collection of digital images taken over time, comprising:

providing the collection of digital images with each digital image containing one or more persons;

storing in a digital database an appearance model having a set of features that are distance measurements associated with facial features of the particular person of interest at an associated time; and providing an individual recognition classifier that uses the appearance model and the associated time to identify the particular person of interest in images from the collection of digital-images.

It is an advantageous effect of the invention that a person of interest can be identified in a digital image or video using an image and an associated time. In other words, the invention recognizes that an image of a baby can depict the same person as the picture of an older child or adult taken at a later date.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the following description, some embodiments of the present invention will be described as software programs.

Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
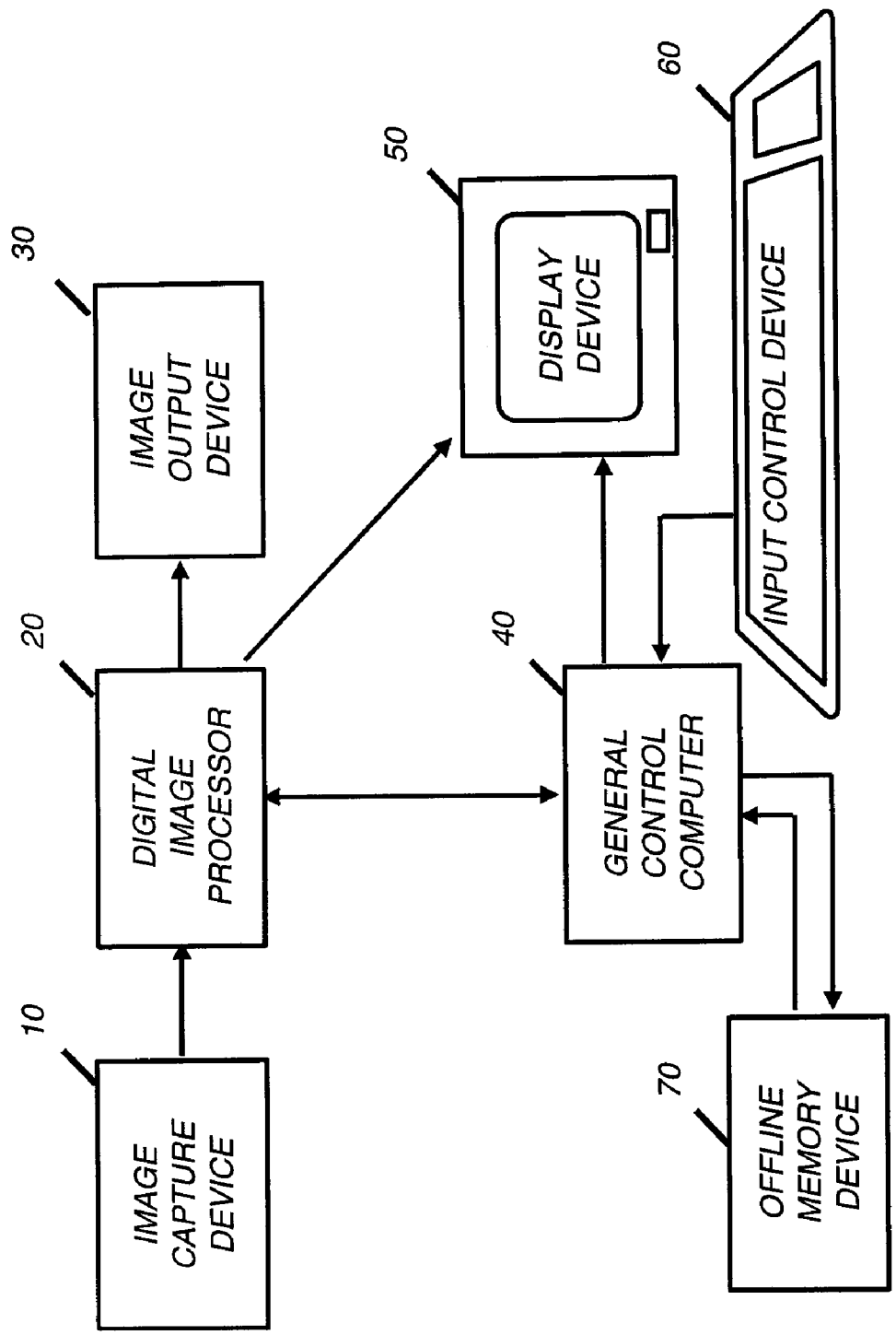
FIG. 1 is a schematic diagram of computer system that can implement the present invention.

The present invention can be implemented in computer hardware and computerized equipment. For example, the method can be performed in a digital camera, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, retail or wholesale photofinishing, or any other system for the processing of digital images. The computer system includes a microprocessor-based unit 20 (also referred to herein as a digital image processor) for receiving and processing software programs and for performing other processing functions. The digital image processor 20 processes images from image capture devices 10 such as cameras, scanners, or computer image generation software. The digital image processor 20 can be used to process digital images to make adjustments for overall brightness, tone scale, image structure, etc. of digital images in a manner such that a pleasing looking image is produced by an image output device 30. The digital image processor 20 interfaces with the general control computer 40 (also a microprocessor based unit) for exchanging data and commands. The general control computer 40 and the digital image processor 20 can be two different microprocessors, or the functions of each can be performs by a single physical microprocessor. The digital image processor 20 often outputs an image to the image output device 30 for example a printer for displaying the image. A display device 50 is electrically connected to the digital image processor 20 for displaying user-related information associated with the software, e.g., by means of a graphical user interface. A keyboard 60 is also connected to the microprocessor based unit 20 via the general control computer 40 for permitting a user to input information to the software. As an alternative to using the keyboard 60 for input, a mouse can be used for moving a selector on the display device 50 and for selecting an item on which the selector overlays, as is well known in the art.

A compact disk-read only memory (CD-ROM) which typically includes software programs, is inserted into the general control computer 40 for providing a means of inputting the software programs and other information to the general control computer 40 and the digital image processor 20. In addition, a floppy disk can also include a software program, and is inserted into the general control computer 40 for inputting the software program. Still further, the general control computer 40 can be programmed, as is well known in the art, for storing the software program internally. The general control computer 40 can have a network connection, such as a telephone line or wireless connection, to an external network, such as a local area network or the Internet.

Images can also be displayed on the display device 50 via a personal computer card (PC Card), such as, as it was formerly known, a PCMCIA card (based on the specifications of the Personal Computer Memory Card International Association) which contains digitized images electronically embodied in the card.

The image output device 30 provides a final image. The image output device 30 can be a printer or other output device that provides a paper or other hard copy final image. The image output device 30 can also be an output device that provides the final image as a digital file. The image output device 30 can also include combinations of output, such as a printed image and a digital file on a memory unit, such as a CD or DVD.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

The present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better -or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention can stand alone or can be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm(s) can interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Figure 2:
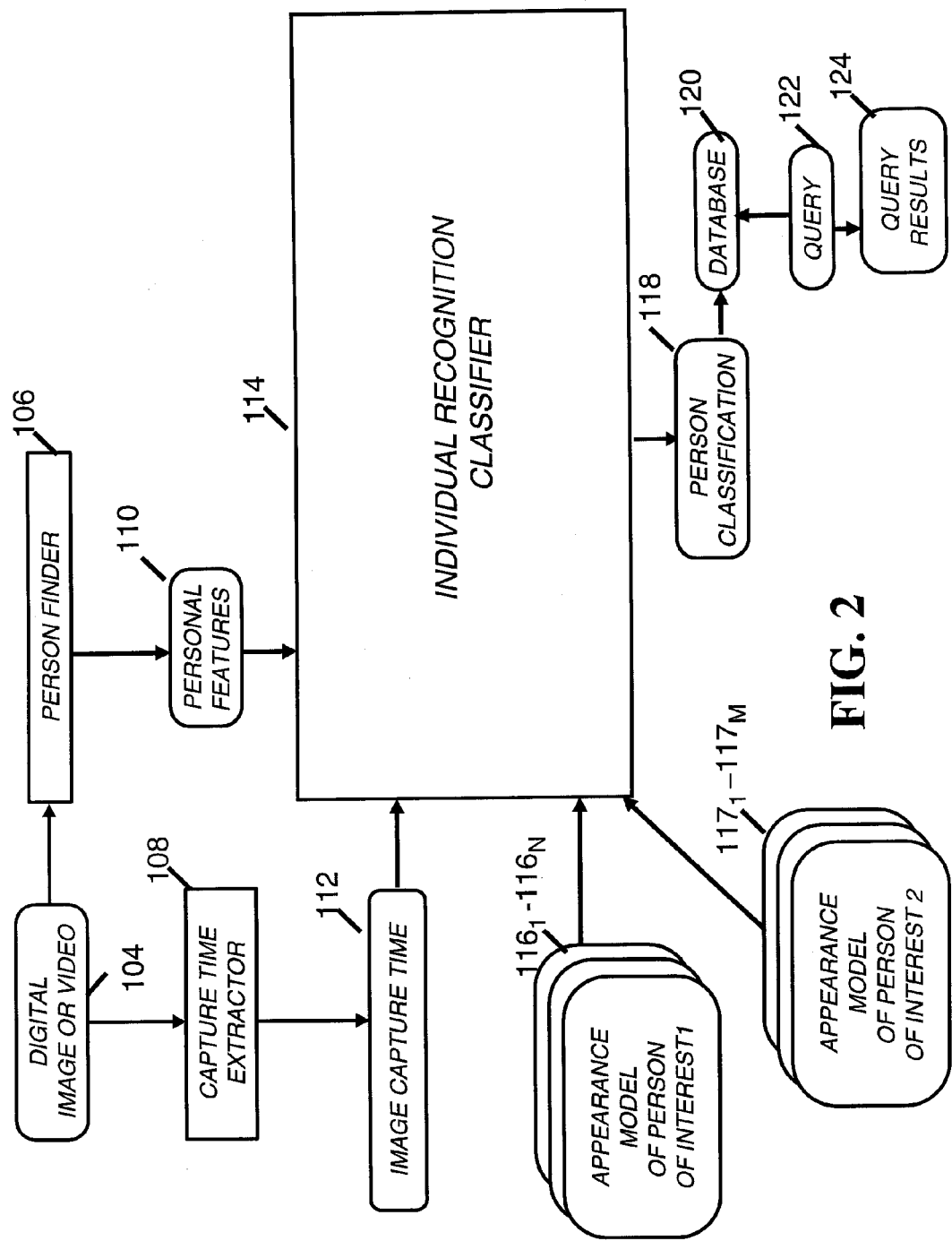
FIG. 2 is a flow chart of an embodiment of the present invention.

An embodiment of the invention is illustrated in FIG. 2. A digital image or video 104 is analyzed to recognize the identities of the people therein. Recognition of the people in a collection of the digital images or videos 104 allows for the creation of a database 120 relating digital images or videos 104 and the identities of the people in the digital images or videos 104. Consequently, the database 120 can be queried with a query 122 to find those images and videos containing the query person. The database 120 can be in any form. In addition, the database 120 can be distributed across many storage locations, by for example, inserting the person classification 118 into the file header of the digital image or video 104. For example, a query 122 for images of "Jim" returns query results 124 containing the set of digital images or videos 104 containing the person of interest "Jim". Then the query results 124 can be returned. The query results 124 are the set of digital images and videos 104 containing the query person.

The digital image or video 104 is passed to the capture time extractor 108. The capture time extractor 108 determines the time the digital image or video 104 was captured, and outputs that image capture time 112. The image capture time 112 of the digital image or video 104 is determined by one of several methods by the capture time extractor 108. Often times the capture time is embedded in the file header of the digital image or video 104. For example, the EXIF image format (described at www.exif.org) allows the image or video capture device to store information associated with the image or video in the file header. The "Date\Time" entry is associated with the date and time the image was captured. In some cases, the digital image or video results from scanning film and the image capture time 112 is determined by detection of the date printed into the image (as is often done at capture time) area, usually in the lower left corner of the image. The date a photograph is printed is often printed on the back of the print. Alternatively, some film systems contain a magnetic layer in the film for storing information such as the capture date. The capture time extractor 108 uses the most appropriate method for extracting the image capture time 112 of the image. Preferably, the source of the digital image 104 is a digital camera, and the capture time extractor 108 extracts the capture time from the image file information.

Note that the image capture time 112 can be a precise minute in time, e.g. Mar. 27, 2004 at 10:17 AM. Or the image capture time 112 can be less precise, e.g. 2004 or March 2004. The image capture time 112 can be in the form of a probability distribution function e.g. Mar. 27, 2004+/−2 days with 95% confidence. The image capture time 112 is input to the individual recognition classifier 114.

The digital image or video 104 is also provided as an input to a person finder 106 for automatic detection of the people in the digital image or video. The person finder 106 identifies one or more persons personal features 110 in the digital video. Preferably, people are found by face detection. Methods for detecting human faces are well known in the art of digital image processing. For example, a face detection method for finding human faces in images is described in the following article: Jones, M. J.; Viola, P., "Fast Multi-view Face Detection", IEEE Conference on Computer Vision and Pattern Recognition (CVPR), June 2003. Furthermore, once a face is detected, the facial features (e.g. eyes, nose, mouth, etc.) can also be localized using well known methods such as described by Yuille et al. in, "Feature Extraction from Faces Using Deformable Templates," Int. Journal of Comp. Vis., Vol. 8, Iss. 2, 1992, pp. 99-111. The authors describe a method of using energy minimization with template matching for locating the mouth, eye and iris/sclera boundary. Facial features can also be found using active appearance models as described by T. F. Cootes and C. J. Taylor "Constrained Active Appearance Models", 8th International Conference on Computer Vision, Vol. 1, pages 748-754. IEEE Computer Society Press, July 2001. In the preferred embodiment, the method of locating facial feature points based on an active shape model of human faces described in "An Automatic Facial Feature Finding System For Portrait Images", by Bolin and Chen in the Proceedings of IS&T PICS Conference, 2002 is used.

Figure 3B:
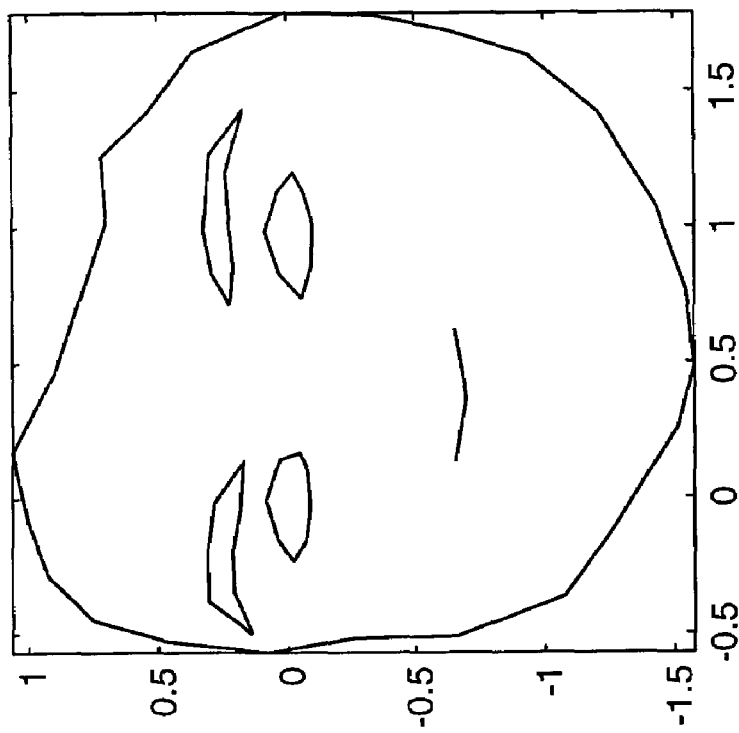
FIGS. 3A and 3B are appearance models of a person of interest having different associated times.
Figure 3A:
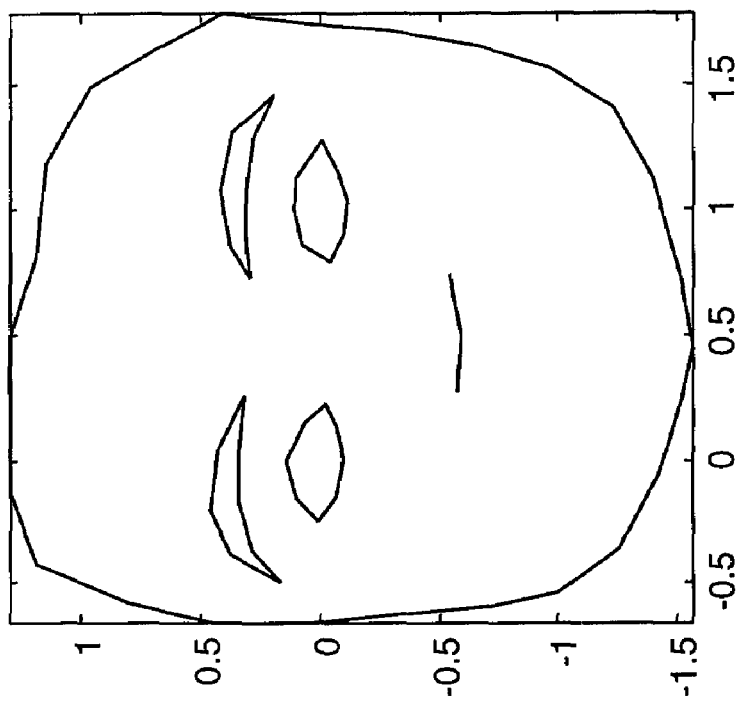

The person finder 106 outputs personal features 110 that are quantitative descriptions of a person detected by the person detector 106. Preferably, the person finder 106 outputs one set of personal features 110 for each detected person. Preferably the personal features are the locations of 82 feature points associated with specific facial features, found using a method similar to the aforementioned active appearance model of Cootes et al. A visual representation of the facial feature points for an image of a face is shown in FIGS. 3A and 3B as an illustration. Alternatively, the personal features 110 can additionally be represented with quantifiable descriptors such as eye color, skin color, face shape, etc. The personal features can also be distances between specific feature points or angles formed by lines connecting sets of specific feature points. Color cues are easily extracted from the digital image or video 104 once the person and facial features are located by the person finder 106. The personal features 110 are input to the individual recognition classifier 114.

Alternatively, different facial features can also be used. For example, an embodiment can be based upon the facial similarity metric described by M. Turk and A. Pentland. In "Eigenfaces for Recognition" Journal of Cognitive Neuroscience. Vol 3, No. 1, 71-86, 1991. Facial descriptors are obtained by projecting the image of a face onto a set of principal component functions that describe the variability of facial appearance. The similarity between any two faces is measured by computing the Euclidean distance of the features obtained by projecting each face onto the same set of functions. In this case, an appearance model can describe the mean and covariance of the projection of multiple images of the same face onto these principal component functions. The similarity metric (for example computed by the person classifier 132 of FIG. 5) can calculate the Mahalonobis of a new face to the mean of the model.

The appearance model and similarity measurement could include a combination of several disparate feature types such as Eigenfaces, facial measurements, color/texture information, wavelet features etc.

A set of appearance models $116_1$-$116_N$ from a stored digital database is input to the individual recognition classifier 114 for determining the identity of the person detected by the person finder 106 and represented by the personal features 110. The appearance models $116_1$-$116_N$ contain a set of features associated with a particular person of interest. Additionally, each appearance model has an associated time. The appearance models $116_1$-$116_N$ represent the personal appearance (preferably the facial appearance) of a person of interest at a specific time or age. The appearance model will be discussed in greater detail hereinbelow. A person of interest is a person that is important to identify in a collection of digital images and videos 104. For example, in a household with small children, each child would likely be a person of interest because it would be useful and valuable for a head of the household to identify occurrences of each child in each photo and video 104 of the digital media collection. The purpose of the individual recognition classifier 114 is to use one or more of the appearance models $116_1$-$116_N$, the image capture time 112, and the personal features 110 to determine if a person detected by the person finder 106 is the person of interest. This is accomplished by comparing the personal features 110 of the detected person with the features of the appearance model 116 of the particular person of interest. The individual recognition classifier 114 outputs the person classification 118. Preferably, the person classification 118 is the likelihood (probability) that the person detected by the person finder 106 is the person of interest. The person classification 118 can be a binary indicator (e.g. true of false) indicating the individual recognition classifier's 114 decision on whether the person associated with the personal features 110 is the person of interest.

By repeating the application of the individual recognition classifier 114 to each person detected in each digital image or video 104 of a collection, all persons detected by the person finder 106 are classified as to the likelihood that each is the particular person of interest.

In addition, appearance models $117_1$-$117_M$ of another person of interest are also input to the individual recognition classifier 114. Each person found by the person finder 106 then generates a set of personal features 110 and the individual recognition classifier 114 outputs a person classification 118 indicating the likelihood that each detected person corresponding to a set of personal features 110 is any of the persons of interest. The person classification is preferably a set of probabilities, one per person of interest, that the personal features 110 corresponding to a person detected by the person finder 106 is that particular person of interest.

To briefly summarize, the individual recognition classifier 114 uses the image capture time 112 and the features of an appearance model 116 having an associated time that is associated with a particular person of interest to produce a person classification 118 describing the likelihood that the detected person is the person of interest.

The person classification 118 information can then be stored in a database 120, associated with the personal features 110 or associated with the digital image or video. When a query 122 is made for images or videos containing a particular person of interest, the database 120 is searched and the appropriate query results 124 are returned to the user on a user interface such as the display device 50 of FIG. 1.

The N appearance models $116_1$-$116_N$ represent the appearance of a person of interest. Each appearance model has an associated time. For example, the appearance model $116_1$ can represent the appearance of the person of interest at age 1, and the appearance model $116_2$ can represent the appearance of the person of interest at age 2. In this example, the associated times are the ages 1 and 2. The time associated with an appearance model can be the age of the person of interest or an absolute time such as a date. As with the image capture time 112, the time associated with an appearance model can be a probability distribution function or can be precise (e.g. the age of the person of interest measured in days) or imprecise (e.g. the age of the person of interest measured in decades). The appearance model of the person of interest can also contain the birth date of the person of interest. As with the image capture time 112 and the time associated with the appearance model, the birth date can be precise (e.g. birth date Jun. 26, 2002) or imprecise (e.g. birth date in the 1960s), or can by represented as a probability distribution function.

For example, FIGS. 3A and 3B shows two different appearance models for a particular person of interest. FIG. 3A shows a graphical representation appearance model of a particular person of interest at age 1 and FIG. 3B shows a graphical representation of a particular person of interest at age 2. Each appearance model illustration shows the outline of the face, the outlines of the eyes and eyebrows, and an indication of the bottom of the nose. The displays are normalized so that the left eye is at (0,0) and the right eye is at (1,0). Note that the eyes appear smaller in the appearance model at age 2 years than at age 1 year as a consequence of the facial modification associated with growth.

Figure 4A:
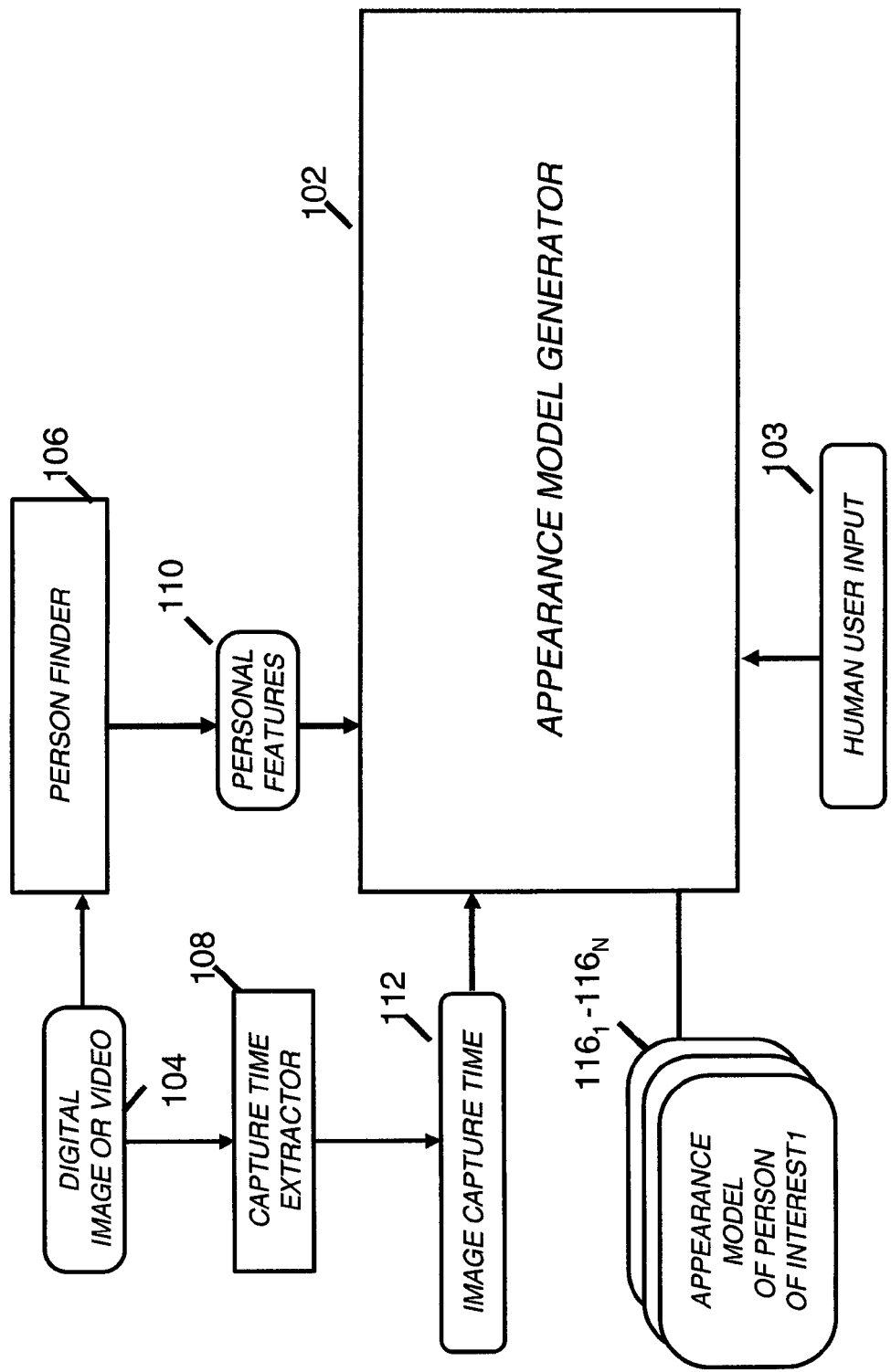
FIG. 4A is a flow chart of an embodiment of the present invention for producing an appearance model with an associated time.
Figure 4B:
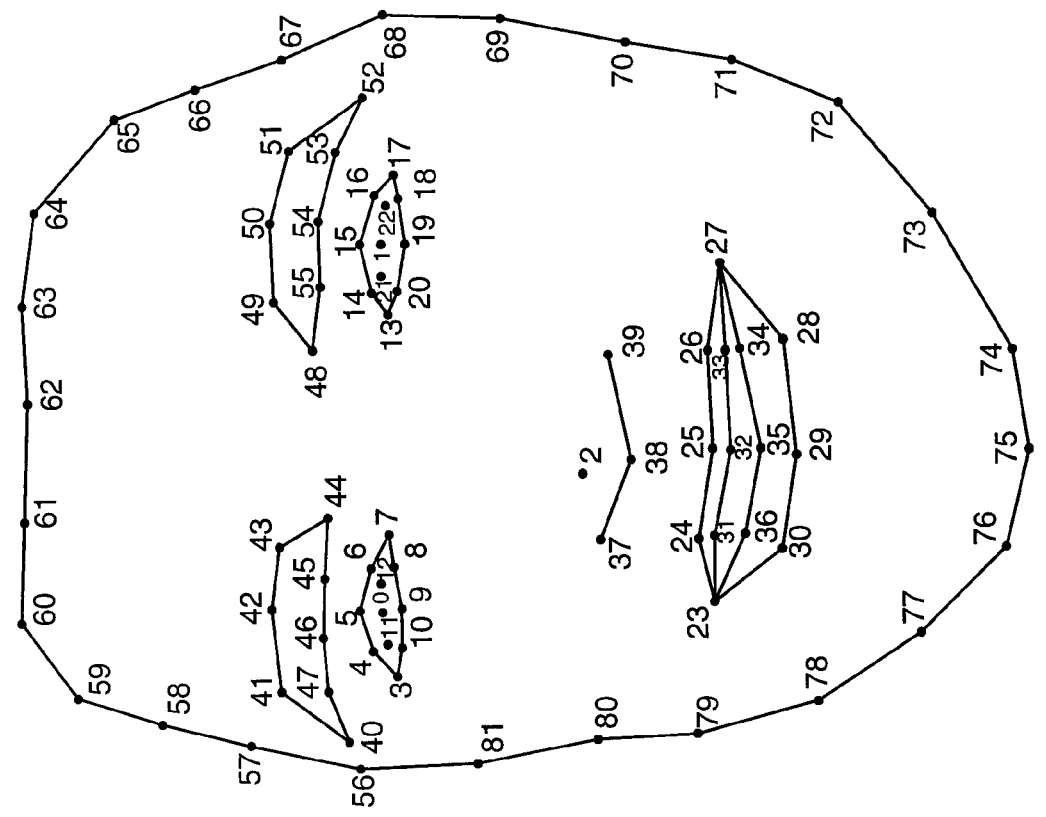
FIG. 4B is an appearance model of a person of interest with labeled feature points.

The preferred method of generating an appearance model for a person of interest is shown in FIGS. 4A and 4B. A collection of digital images or videos 104 are processed by calculating the personal features 110 from a set of images containing the person of interest. The person finder 106 finds people in the images and the personal features are calculated 110. The human faces found are grouped into clusters of similar faces, where each cluster should represent an individual or a specific appearance of an individual, as described in the commonly assigned U.S. Published Patent Application 20030210808 A1 published on Nov. 13, 2003. A human user ensures that the clustering is correct and all the people in a single cluster are the same person of interest. Also, the capture time extractor 108 extracts the image capture time 112 associated with each image or video 104. The image capture time 112 and the personal features 110 are input to the appearance model generator 102. The appearance model generator outputs a set of appearance models $116_1$-$116_N$ for the person of interest. Human user input 103 is also input to the appearance model generator 102, indicating the birth date of the person of interest. The appearance model generator uses the personal features associated with the person of interest and generates a set of appearance models $116_1$ to $116_N$. For example, the appearance model generator 102 uses the personal features associated with all detections of the person of interest by the person finder 106 when the person of interest is of age 1 year to generate appearance model $116_1$. Then, the appearance model generator 102 uses the personal features associated with all detections of the person of interest by the person finder 106 when the person of interest is of age 2 years to generate appearance model $116_2$.

Because the human face changes most rapidly during the growing years (ages 0 to 16 years), appearance models for children are required with smaller intervals in time (with respect to the associated times of the appearance models) than the appearance models for the non-growing years. A greater number of appearance models are required for good performance for children during the growing years than for adults in the non-growing years. For example, it can be preferable to generate an appearance model at intervals of associated time of every year between the ages of 0 and 6, every 2 years between the ages of 6 and 16, every 3 years between ages 16 and 22, and every 5 years after that. An appearance model 116 can be generated by calculating the mean and covariance of all instances of the personal features for the person of interest where the age (if the birth date of the person of interest is known, image capture time is used otherwise) of the person of interest is within a given interval. To summarize, the appearance model 116 contains features representing quantitative facial attributes. In the preferred embodiment, these facial attributes are measurements associated with facial features such as the eyes, nose, mouth, and forehead. The features used are listed in Table 1 and their computations refer to the points on the face shown numbered in FIG. 4B. Arc (Pn, Pm) is defined as $$\sum_{i=n}^{m-1} \|Pn - P(n+1)\|$$

where $\|Pn-Pm\|$ refers to the Euclidean distance between feature points n and m. These arc-length features are divided by the inter-ocular distance to normalize across different face sizes. Point PC is the point located at the centroid of points 0 and 1 (i.e., the point is exactly between the eyes). The facial measurements used here are derived from anthropometric measurements of human faces that have been shown to be relevant for judging gender, age, attractiveness and ethnicity (ref. "Anthropometry of the Head and Face" by Farkas (Ed.), $2^{nd}$ edition, Raven Press, New York, 1994).

TABLE 1

List Of Ratio Features

| Name | Numerator | Denominator |
| --- | --- | --- |
| Eye-to-nose/Eye-to-mouth | PC–P2 | PC–P32 |
| Eye-to-mouth/Eye-to-chin | PC–P32 | PC–P75 |
| Head-to-chin/Eye-to-mouth | P62–P75 | PC–P32 |
| Head-to-eye/Eye-to-chin | P62–PC | PC–P75 |
| Head-to-eye/Eye-to-mouth | P62–PC | PC–P32 |
| Nose-to-chin/Eye-to-chin | P38–P75 | PC–P75 |
| Mouth-to-chin/Eye-to-chin | P35–P75 | PC–P75 |
| Head-to-nose/Nose-to-chin | P62–P2 | P2–P75 |
| Mouth-to-chin/Nose-to-chin | P35–P75 | P2–P75 |
| Jaw width/Face width | P78–P72 | P56–P68 |
| Eye-spacing/Nose width | P07–P13 | P37–P39 |
| Mouth-to-chin/Jaw width | P35–P75 | P78–P72 |

TABLE 2

List Of Arc Length Features

| Name | Computation |
| --- | --- |
| Mandibular arc | Arc (P69, P81) |
| Supra-orbital arc | (P56 – P40) + Int (P40, P44) + (P44 – P48) + Arc (P48, P52) + (P52 – P68) |
| Upper-lip arc | Arc (P23, P27) |
| Lower-lip arc | Arc (P27, P30) + (P30 – P23) |

Figure 5:
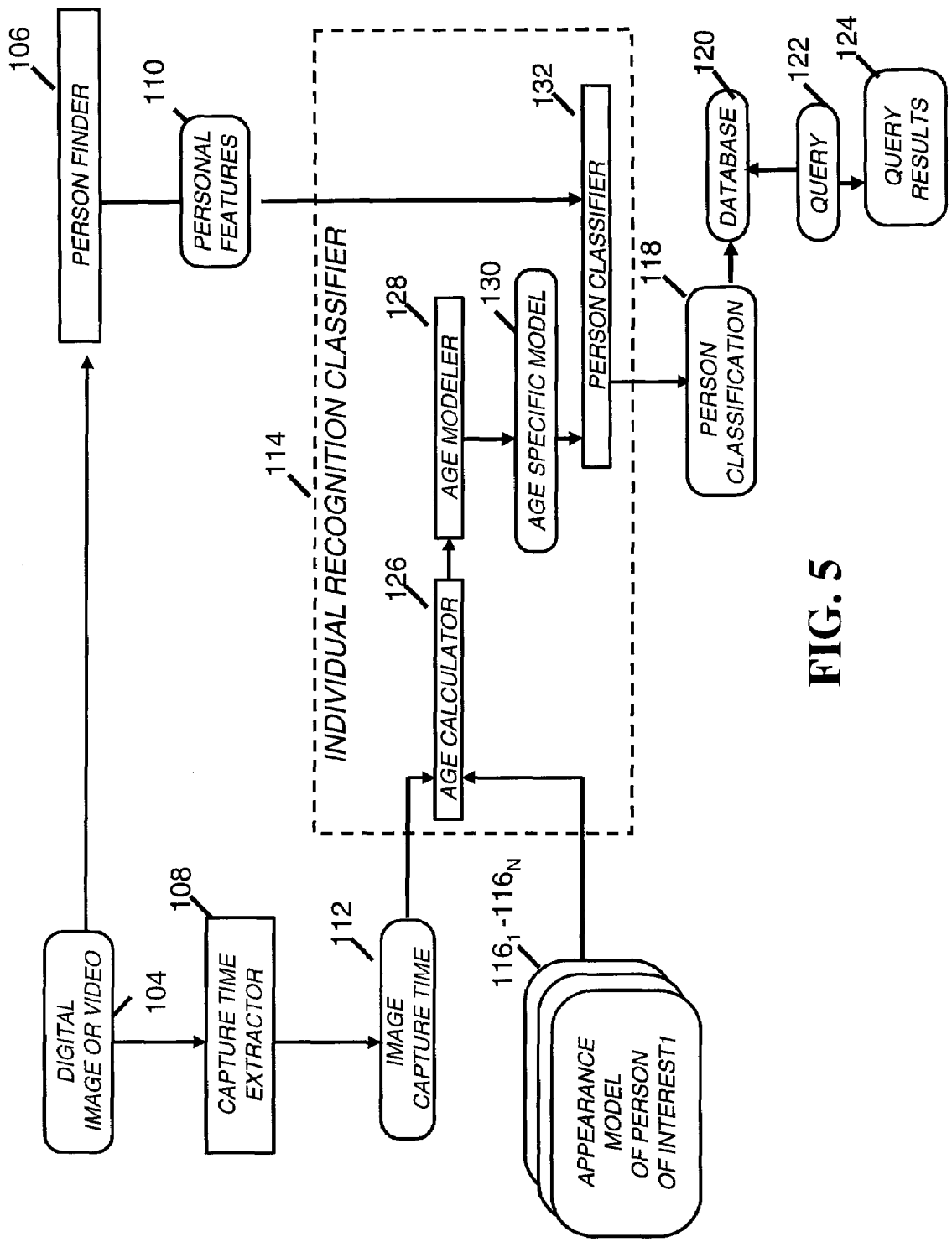
FIG. 5 is a more detailed flow chart of an embodiment of the present invention.

An appearance model describes the appearance of the person of interest at an associated time. A given appearance model can contain sub-models for specific cases. For example, within a given appearance model there can be one sub-model for the person of interest when wearing glasses and a second appearance model for the person of interest without glasses FIG. 5 illustrates a more detailed view of the individual recognition classifier 114, when the time associated with an appearance model $116_1$ to $116_N$ is the age of the person of interest and the birth date of the person of interest is known. The age calculator 126 calculates the age of the person of interest at the image capture time. For example, if the image capture time is Nov. 2, 1999 and the birth date of the person of interest is 1977, then the age calculator 126 determines that the age of the person of interest is 7976 to 8340 days old (21 years 10 months 2 days to 22 years 10 months 1 day old). The age modeler 128 uses the appearance models of the person of interest $116_1$ to $116_N$ and the age of the person of interest calculated by the age calculator to produce an age specific model 130. The age modeler 128 preferably selects, from the N appearance models of the person of interest $116_1$-$116_N$, the appearance model having the associated time (age) most closely matching the age of the person of interest at the image capture time. For example, when the age of the person of interest is 7976 to 8340 days old, the appearance model corresponding to the person of interest at the age of 22 is selected.

When the age calculator 126 returns a negative time amount, this indicates that the image capture time precedes the birth date of the person of interest. In typical consumer images and video, it is highly unusual to have images or video of an individual before birth (except for medical imaging techniques such as ultrasound). Therefore, in cases where the image capture time 112 is before the birth date of the person of interest (contained in the appearance model 116), the individual recognition classifier 114 produces a person classification 118 indicating that the person detected by the person finder 106 is not the person of interest (or has very low or zero probability or being the person of interest). Likewise, when the age calculator 126 determines that the age of the person of interest at the time the image is captured is greater than the human life expectancy (e.g. 116 years old), then the person classifier 132 produces a person classification 118 indicating that the person detected by the person finder 106 is not the person of interest (or has very low or zero probability or being the person of interest).

Figure 7:
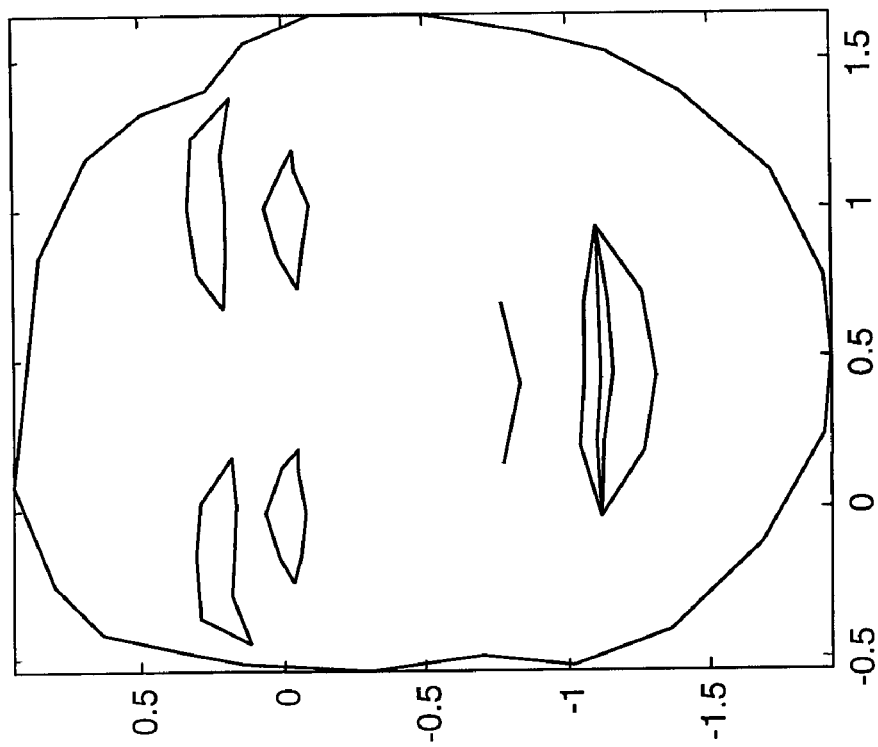
FIG. 7 shows a modification of the appearance model, representing a possible appearance of the child as an adult.
Figure 6:
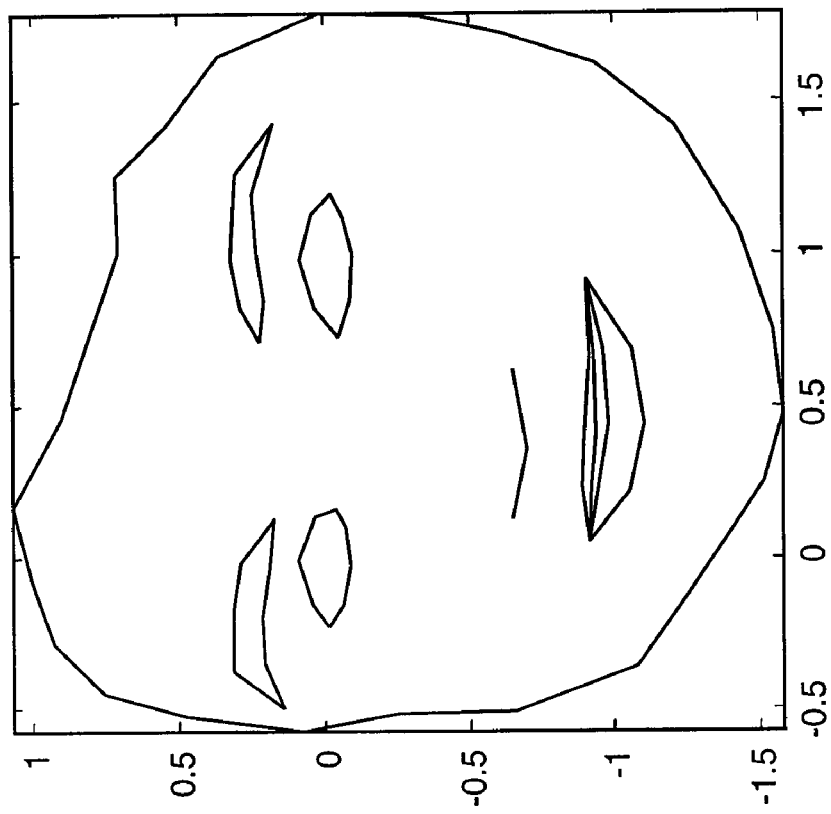
FIG. 6 shows an appearance model for a child.

Alternatively, there can be no appearance model 116 of the person of interest at an associated time near to the image capture time 112. For example, a particular person of interest can have only one appearance model 116 corresponding to the person of interest at the age of 2 years old. This model 116 will not be appropriate for determining whether the person of interest is in an image captured when the age of the person of interest would be 22 year old. The appearance model 116 can be appropriate if its associated time indicates it is within 1 year of the age of the person of interest when the age of the person of interest is between the ages of 0 and 6, within 2 years between the ages of 6 and 16, within 3 years between the ages 16 and 22, and within 5 years for ages older than 22. If the model is not appropriate, then the age modeler 128 selects one or more appearance models $116_1$-$116_N$ having an associated time(s) closest to the age of the person of interest at the image capture time 112. Then the age modeler 128 modifies the selected appearance model(s) to compensate for the difference in time between the times associated with the appearance model(s) and the determined age of the person of interest at the image capture time 112. This is accomplished by using a generic model for how the personal features change as a person ages. The generic model is a mathematical description of the movement of facial features (e.g. eyes, mouth, nose, etc.) as a person ages, on average. Specialized models can be used for describing the movement of facial features when the gender, ethnic background, etc. of the person of interest is known. To illustrate this concept, FIG. 6 shows a representation of the appearance model of a particular baby with the associated time of 3 months of age. This appearance model is modified by a generic model associated with the movement of facial feature points from babies to adults to form the age specific appearance model 130 for when the baby is an adult of 30 years old shown in FIG. 7. In this example, the generic model indicates the change in facial feature point position from babies to adults. However, a similar model of aging can be used to model the changes in facial structure between any two ages, such as between the ages of 3 and 5 or 5 and 10 years old. In addition, the aging model can be used to produce an age specific modified appearance model younger than the age associated with the appearance model. For example, an appearance model associated with an age of 30 years can be modified to produce an age specific model of the individual of interest at the age of 5 years old.

In a further alternative, the age specific model 130 can be generated by interpolating between two or more appearance models $116_1$-$116_N$ of the person of interest. For example, the appearance models for a person of interest exist for the ages of 4 and 8. The age calculator 126 determines that the person of interest is 6 years old when the image is captured. The appearance models associated with ages 4 and 8 can be combined (e.g as a weighted average) to create an estimated age specific model for the individual of interest at the age of 6.

Referring again to FIG. 5, the age specific model 130 generated by any of the aforementioned methods is input to the person classifier 132 along with the personal features 110 found by the person finder 106 for producing the person classification 118.

The query 122 can include a person's identity and a time (an absolute time or an age). For example, the query can be for image of "Pete" during 1999, or for images of "Pete" at the age of 34 years. The person classifier 132 computes a similarity score between the facial measurements computed from facial images from the user's image collection, and the appearance model stored for the person at the age specified in the query 122. A list of retrieved images is shown to the user ranked by decreasing similarity. The similarity score is a weighted difference between the given facial measurements and the model where the weights are proportional to the importance of the particular facial measurement in distinguishing between individuals. For example, the Mahalanobis distance can be used where the weights are based on the variance of the measurements. In a preferred embodiment, distributions of differences between each of the facial measurements are computed for examples from the same individual, and for different individuals from a large set of facial images of known identity. The equi-probable point for each facial measurement is computed (where it is equally likely that the difference is from intra-person variation as it is due to the two measurements being from different individuals) assuming zero-mean Gaussian distributions. The weight used for unknown differences is inverse of this point, so that any difference is expressed as a fraction of the equi-probable difference.

Figure 8:
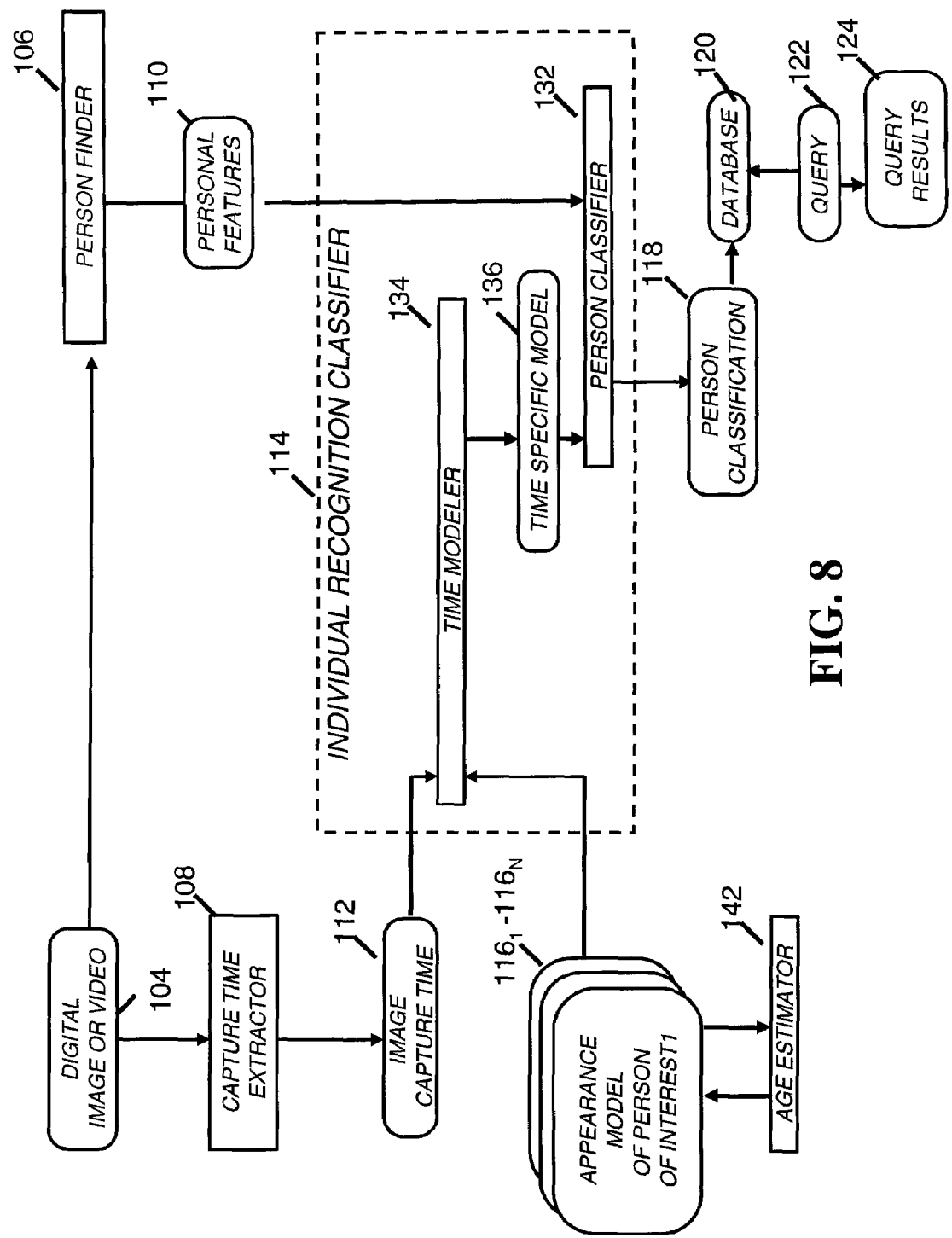
FIG. 8 is a flow chart of an alternative embodiment of the present invention.

FIG. 8 shows an alternative embodiment where the time associated with the appearance models 116 is calendar date (i.e. absolute time), and the birth date of the person of interest is not known. In this case, the time modeler 134 produces a time specific appearance model 136 by selecting the appearance model with associated absolute time closest to the image capture time 112. This time specific model 136 is then passed to the person classifier 132 for producing the person classification 118 as previously described. In this case, because the birth date of the person of interest in unknown, the generic aging model cannot be used to model the appearance of the individual of interest at times other than the times associated with the appearance models of the person of interest $116_1$-$116_N$. In some cases, the birth date of the individual of interest can be estimated by an age estimator 142. When the birth date of the person of interest is successfully determined by the age estimator 142, this information is added to the appearance model 116. Then the method as described in reference to FIG. 5 can be used.

The age estimator 142 determines the age associated (and consequently the birth date of the person of interest) with the appearance models or the digital images from which the appearance models were derived. The age estimator 142 can be, for example, the method described by Lobo in U.S. Pat. No. 5,781,650. The robustness of the estimation of birth data of the person of interest is improved when the age estimator 142 estimates the ages of many images or many appearance models, and the results of all estimates are merged. The robustness is further improved because the relative time between the images and appearance models is known. Therefore, erroneous age estimates can be rejected when the multiple estimates are merged.

Figure 9:
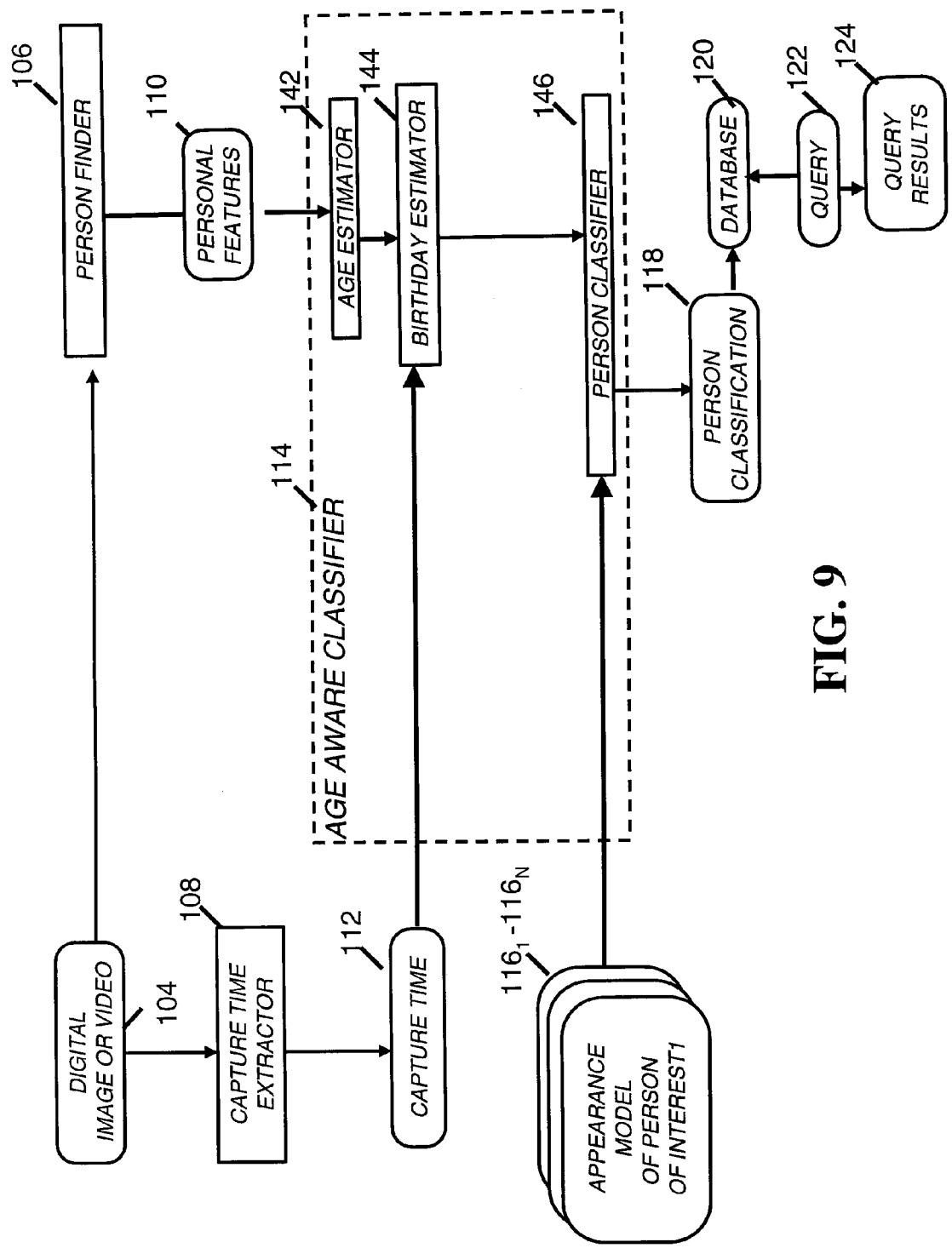
FIG. 9 is a flow chart of an alternative embodiment of the present invention.
Figure 10:
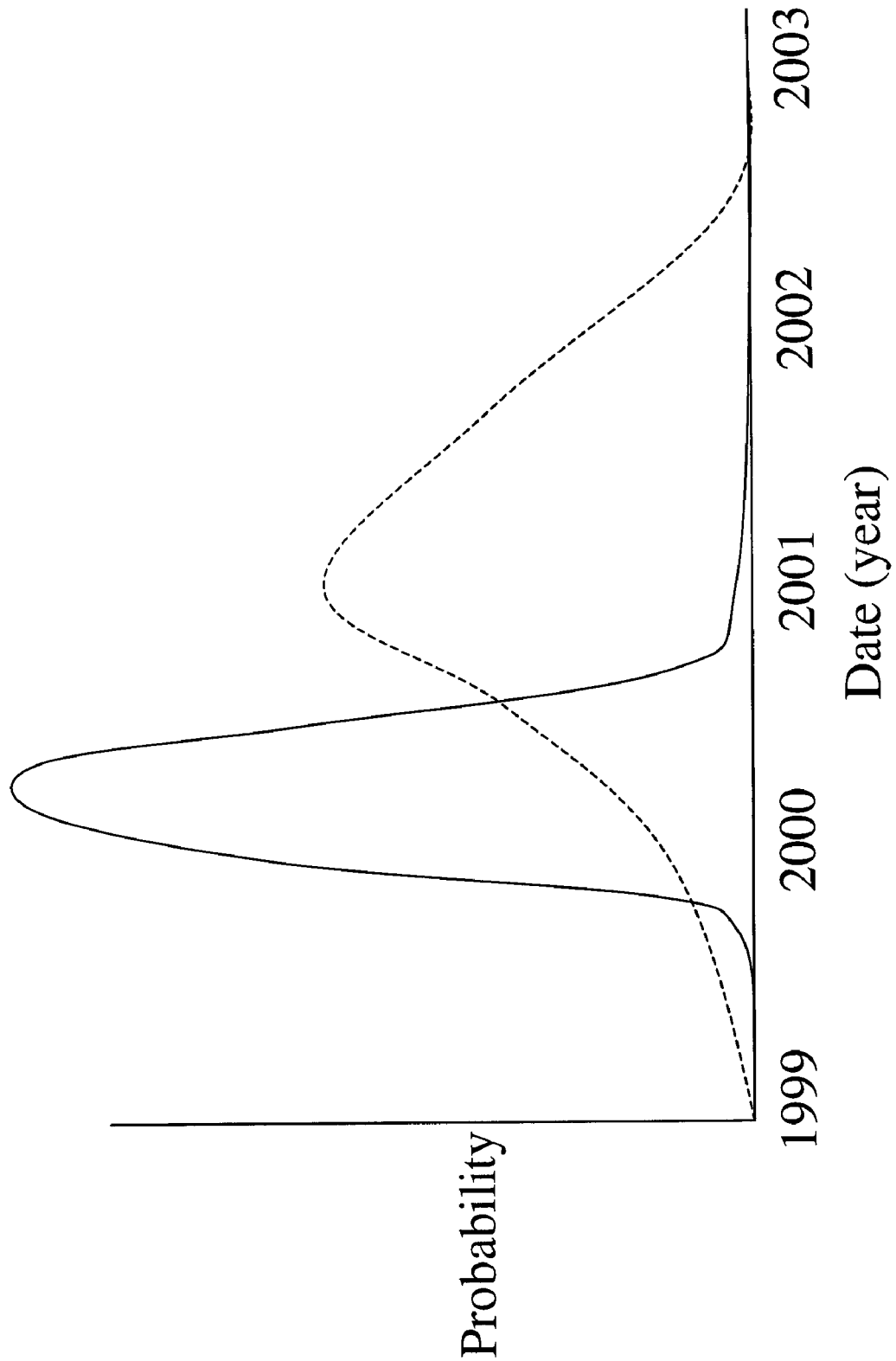
FIG. 10 is a plot of probability distributions associated with an estimated birth date and a birth date associated with an appearance model.

FIG. 9 shows a further alternative embodiment of the present invention. In this embodiment, the age estimator 142 is applied to the personal features 110 or the original digital image or video 104 associated with the detected person. Using the estimated age from the age estimator 142 and the capture time 112 associated with the digital image or video 104, the birthday estimator 144 can estimate the birth date of the detected person. As previously described, this detected birth date is a probability distribution function. This detected birth date is compared with the birth date associated with the appearance model of the person of interest 116 by the person classifier 146 to produce the person classification 118. For example, FIG. 10 shows an illustration of the estimated birth date and the birth date associated with the appearance model. The age estimator 142 estimates that the birth date of the person detected by the person finder 106 is the distribution shown by the dashed line. The birth date distribution associated with the appearance model is shown by the solid line. The person classifier 146 determines a person classification (e.g. the sum of the square roots of the products of the two aforementioned distributions) based on the estimated birth date distribution from the birthday estimator 144 and the birth date associated with the appearance model 116 (and possibly other factors are considered). The person classifier 146 can for example compute the product of the distributions as the person classification 118 that indicates the probability or likelihood that the detected person is the person of interest.

FIG. 9 provides the benefit ensures a person of interest is not detected in images having image capture dates preceding the birth date of the person of interest. For purpose of illustration, assume the age estimator 142 simply estimates that any person that could be found by the person finder 106 in the image 104 is at least 0 years old. The birthday estimator 144 then determines that the birth date of any found person must be earlier than the capture time 112. Therefore, the embodiment of FIG. 9 provides for not finding the person of interest in any image captured before the birth date associated with the person of interest. The age aware classifier 114 searches for the person of interest having an associated birth date in images 104 with capture times later than the birth date and does not search for the person of interest in images 104 with capture times before the birth date.

It is known that the method described herein will have certain failure modes. For example, if an image of a statue of George Washington at age 21 is captured on Mar. 14, 2005, then the age calculator 126 of FIG. 5 calculates the age of the person of interest (George Washington) to be 273 years old, and therefore the person classifier 132 outputs a person classification that the detected person cannot possibly be George Washington, because 273 years far exceeds the life expectancy of people. In other words, the method can fail in the relatively rare case when a digital image captures an image of a person rather than an actual person.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 keyboard
82 feature points
102 appearance model generator
103 human user input
104 digital image or video
106 person finder
108 capture time extractor
110 personal features
112 image capture time
114 individual recognition classifier
116 appearance model
118 person classification
120 database
122 query
124 query results
126 age calculator
128 age modeler
130 age specific appearance model
132 person classifier
134 time modeler
136 time specific appearance model
142 age estimator
144 birthday estimator
146 person classifier

The invention claimed is:

1. A method of identifying a person in a digital image by using a collection of digital images taken over time, comprising:
one or more processors to implement
providing the collection of digital images with each digital image containing one or more persons;
storing in a digital database appearance models having a set of features that are distance measurements associated with facial features of persons of interest each at an associated time;
providing a new digital image of a person of interest and the associated image capture time and the age of the person of interest in the new digital image; and
providing an individual recognition classifier that modifies one or more appearance models to compensate for the difference in time between the times associated with the appearance models and the determined age of the person of interest at the digital image capture time.

2. The method of claim 1, wherein the distance measurements are ratios or angles associated with distances between facial features.

3. The method of claim 2, wherein the facial features include eyes, nose, eyebrows, or mouth.

4. The method of claim 1, wherein a greater number of appearance models is used for children during their growing years.

5. The method of claim 1, wherein the birth dates of the persons of interest for each appearance model are known, and wherein the individual recognition classifier modifies one or more appearance models to compensate for the age difference between the age of the person of interest in the digital image and the age associated with the appearance models.

6. The method of claim 1 further including at least two appearance models with different associated times.

7. The method of claim 1, wherein the features include the birth date of the particular person of interest.

8. The method of claim 1, wherein the associated time is either calendar date or age of the particular person of interest.

9. The method of claim 1, further including at least two appearance models with different associated times, wherein the appearance model with the associated time closest to the image capture time is used by the individual recognition classifies to identify the particular person of interest.

10. The method of claim 1, wherein the appearance model is modified to produce an age specific appearance model that is used by the individual recognition classifier to identify the particular person of interest.

11. The method of claim 1, further including at least two appearance models with different associated times, wherein an age specific appearance model is produced from the at least two appearance models, and wherein the age specific appearance model is used by the individual recognition classifies to identify the particular person of interest.

* * * * *